(12) United States Patent
Baumann et al.

(10) Patent No.: US 12,297,087 B2
(45) Date of Patent: May 13, 2025

(54) PATIENT POSITIONING TABLE

(71) Applicant: Siemens Healthcare GmbH, Erlangen (DE)

(72) Inventors: Berthold Baumann, Kastl (DE); Johannes Stock, Reuth bei Erbendorf (DE)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 17/887,558

(22) Filed: Aug. 15, 2022

(65) Prior Publication Data

US 2023/0057966 A1 Feb. 23, 2023

(30) Foreign Application Priority Data

Aug. 18, 2021 (DE) ...................... 10 2021 209 083.4

(51) Int. Cl.
  *B66F 7/06* (2006.01)
  *B62D 55/084* (2006.01)
  *B65G 39/16* (2006.01)

(52) U.S. Cl.
  CPC .............. *B66F 7/065* (2013.01); *B65G 39/16* (2013.01); *B62D 55/0842* (2013.01)

(58) Field of Classification Search
  CPC . B66F 7/065; B66F 7/28; B65G 39/16; B65G 69/24; B65G 15/64; B65G 15/62;
  (Continued)

(56) References Cited

U.S. PATENT DOCUMENTS

| 3,785,462 A | * | 1/1974 | Coad | ....................... B66F 7/065 |
| | | | | 187/269 |
| 6,705,238 B1 | * | 3/2004 | Heckert | ................... B66F 7/065 |
| | | | | 248/421 |

(Continued)

FOREIGN PATENT DOCUMENTS

| CN | 111377376 A | 7/2020 |
| CN | 213170015 U | 5/2021 |

(Continued)

OTHER PUBLICATIONS

Corrado, A. et al.: "To design a belt drive scissor lifting table", in: International Journal of Engineering and Techno-logy (IJET), vol. 8 No. 1 Feb.-Mar. 2016, S. 515-525.

(Continued)

*Primary Examiner* — Justin C Mikowski
*Assistant Examiner* — Luke Hall
(74) *Attorney, Agent, or Firm* — Harness, Dickey & Pierce, P.L.C.

(57) ABSTRACT

Each scissor frame of the patient positioning table has a first and a second scissor arm connected in an X-shaped arrangement to pivot about a common pivot axis via a lifting facility for vertically moving the positioning table. The lifting facility includes a roller arrangement configured to be moved by a traction device. The roller arrangement is arranged between, and guides, arm segments of the scissor frames. The arm segments open in a V-shape, wherein the traction device is fixed in position by at least one end and is led via a roller unit having deflecting rollers, one located upstream of the roller arrangement and one located downstream of the roller arrangement. The position of the roller arrangement between the arm segments is variable with the aid of a drive facility, which interacts with the traction device.

21 Claims, 5 Drawing Sheets

(58) Field of Classification Search
CPC ............... B65G 23/44; B62D 55/0842; B65H 2404/253; F16H 7/20; G03G 15/1615; G03G 2215/00561; G03G 15/6567
USPC ............................................................ 5/611
See application file for complete search history.

(56) References Cited

U.S. PATENT DOCUMENTS

| | | | | |
|---|---|---|---|---|
| 2003/0168646 | A1* | 9/2003 | Lopez Alba | B66F 7/065 254/122 |
| 2004/0251453 | A1* | 12/2004 | Kaufman | B66F 7/065 187/269 |
| 2005/0266947 | A1* | 12/2005 | Miyata | F16H 7/20 474/148 |
| 2007/0017748 | A1* | 1/2007 | Heckert | B66F 7/065 187/211 |
| 2015/0090564 | A1* | 4/2015 | Iwaya | G03G 15/6567 198/835 |
| 2015/0321891 | A1* | 11/2015 | Mohr | B66F 7/28 254/122 |
| 2018/0319602 | A1* | 11/2018 | German | B65G 39/09 |

FOREIGN PATENT DOCUMENTS

| | | |
|---|---|---|
| DE | 20216478 U1 | 2/2003 |
| DE | 102004061182 A1 | 6/2006 |
| DE | 102012209125 A1 | 11/2013 |
| DE | 202012013168 U1 | 3/2015 |
| DE | 102021207163 A1 | 1/2023 |
| EP | 1375410 A1 | 1/2004 |

OTHER PUBLICATIONS

German Office Action and English translation thereof dated Apr. 19, 2022.
German Decision to Grant a Patent and English translation thereof dated Mar. 1, 2023.

* cited by examiner

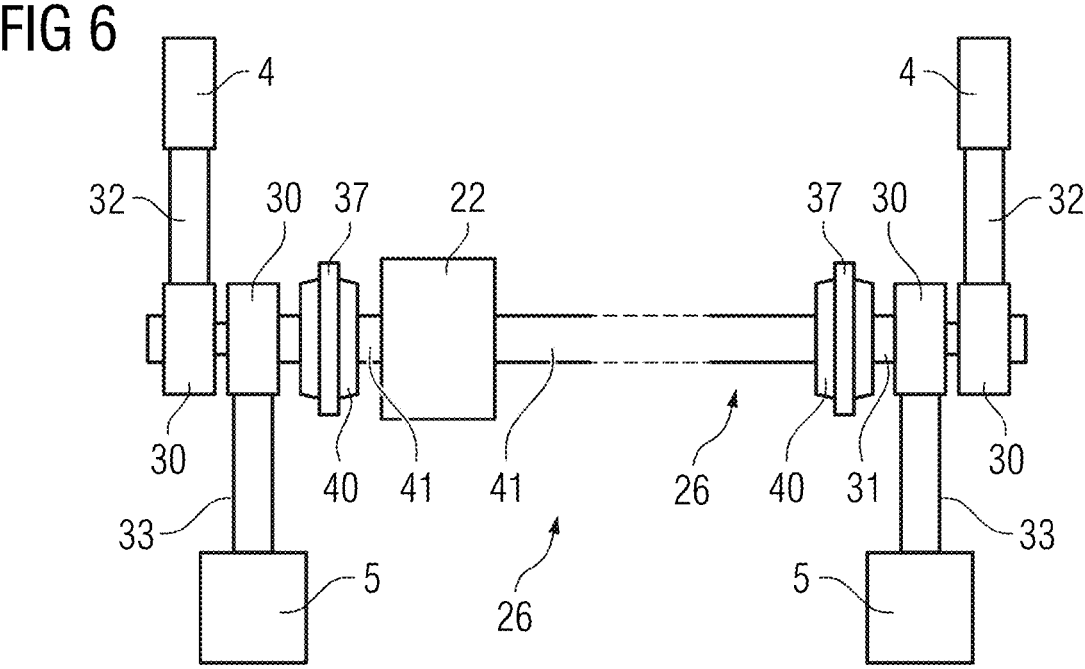
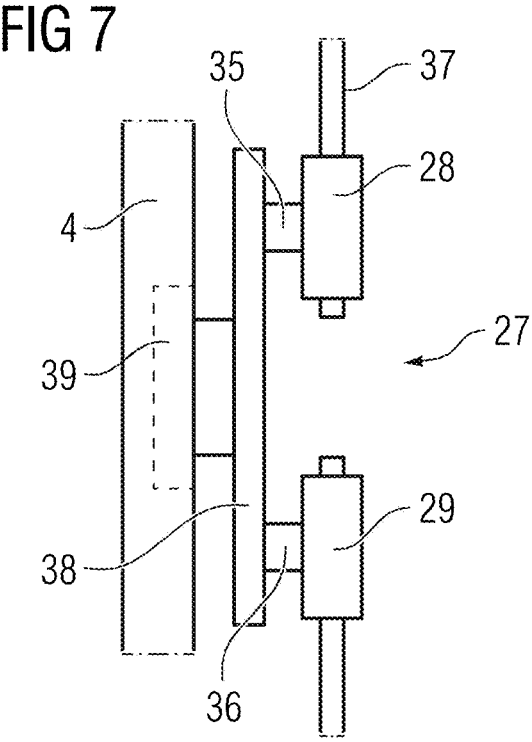

PATIENT POSITIONING TABLE

CROSS-REFERENCE TO RELATED APPLICATION(S)

The present application claims priority under 35 U.S.C. § 119 to German Patent Application No. 10 2021 209 083.4, filed Aug. 18, 2021, the entire contents of which are incorporated herein by reference.

BACKGROUND

A patient table may be used in various applications in medical technology. It may be used for both examination and also treatment purposes.

SUMMARY

One or more example embodiments of the present invention relate to a patient positioning table, comprising two scissor frames each having a first and a second scissor arm, which are connected to each other in an X-shaped arrangement so as to be capable of pivoting about a common pivot axis, and can be pivoted relative to each other with the aid of a lifting facility for moving vertically a positioning table connected to the scissor frames, wherein the lifting facility comprises a roller arrangement coupled to, and movable by, at least one traction device, the said roller arrangement being arranged between, and guiding, two arm segments of the scissor frames, the said arm segments opening in a V-shape.

A patient positioning table of this type is used in various applications in medical technology. It is used for both examination and also treatment purposes. The patient can be accommodated on a table top, wherein this table top can be varied in height so it can be adjusted between a lowered position, which makes it easier to get onto, and a raised examination or treatment position. A lifting facility is used for this, which allows the adjustment of two scissor frames on which the table top is ultimately mounted. The two scissor frames each have two pivot arms connected to each other in an X-shaped arrangement so as to be capable of pivoting, which arms are more or less closed together for lowering, that is to say the X-arrangement is made flatter, and are opened out for lifting, that is to say the X-arrangement is raised up.

This type of patient positioning table has two scissor frames arranged in parallel, each having two pivot arms, wherein the scissor frames are moved synchronously with each other. They are fixed by their lower ends for example to a support plate or a support frame, wherein for example one arm end in each case is mounted in a fixed position in a locating bearing, but in a pivoting manner, while the other end is guided via a floating bearing so as to be capable of linear movement, wherein the said arm ends are also mounted in a pivoting manner. The upper arm ends are connected for example with the aid of a table holding device, to which the table top can be detachably affixed, wherein again one end is mounted in a fixed position in a locating bearing, and can be pivoted, and the other is guided in a linear manner via a floating bearing, and can be pivoted.

Various lifting facilities are known for adjusting height. Spindle drives are mostly used, for example in the form of ball screw spindles or trapezoidal spindles, wherein the respective spindle and a nut running on same are displaced relative to each other, and the element or elements to be lifted or lowered are coupled for example to the spindle nut traveling along the positionally fixed spindle. Spindle drives of this type are not only relatively maintenance-intensive, in particular with reference to the provision of lubricant, but moreover there is also some generation of noise during operation, in particular wherein the load is to be lifted higher. The noise backdrop also changes during the lifting due to the lifting conditions between the lower and upper lifting position. Moreover operating life is limited due to the presence of inherent friction within the spindle drive.

As an alternative to this, lifting facilities with a traction drive are known. Here the lifting of the scissor frames is effected via a traction device that can be wound onto and off of a winding shaft, for example a belt. To achieve this the traction device is fixed by its other end to one of the scissor frames. Thus it runs from the winding shaft to the scissor frame. To create the actual lifting movement, the traction device is coupled to or loops around a roller arrangement, wherein this roller arrangement is arranged between two arm segments of the scissor frames, the said arm segments opening in a V shape. This functions in such a way that the roller arrangement, when the traction device is wound on, is more or less pressed further between the arm segments so that same are pressed apart for the purpose of lifting. When the traction device is wound off, the load on the roller arrangement is removed again so that the scissor frames are folded together again due to weight, and in the process the roller arrangement is pushed back again. An example of such a traction drive is described in the publication Corrado Andrea et al., "To design a belt drive scissor lifting table", International Journal of Engineering and Technology (IJET), Vol. 8 No. 1 February-March 2016, pp. 515-525. There the belt runs from the winding shaft arranged on the floor side, that is to say on a frame support, via the roller arrangement to a fixing facility arranged on the side of a scissor arm where the end of the belt is fixed. In terms of a fixing on the side of the arm, a multipart and therefore complex holding device is provided on the arm side, extending along the arm, to which the belt end is fixed.

An object underlying one or more example embodiments of the present invention is to disclose a patient positioning table with a simplified design compared to the above.

To achieve this object one or more example embodiments of the present provide, in the case of a patient positioning table of the type mentioned in the introduction, for the traction device to be fixed in position by at least one end and to be led via at least one roller unit comprising deflecting rollers, one located upstream of the roller arrangement and one downstream of the roller arrangement, in an omega shape, wherein the position of the roller arrangement between the arm segments can be varied with the aid of a drive facility which interacts with the traction device.

According to one or more example embodiments of the present invention, the traction device is led in a special manner via two deflecting rollers of a roller unit and also via the roller arrangement, wherein the guiding is implemented in the shape of an omega. That is to say the traction device runs to the first deflecting roller, loops partly around same and runs to the roller arrangement, also loops around same and runs to the second deflecting roller, and also loops around same, from where it then runs on. The two deflecting rollers and the roller arrangement are positioned in a triangular shape with reference to their axes of rotation, so that an omega-shaped traction device pathway is produced. Furthermore a drive facility which interacts with the traction device is provided, which can be implemented in various ways, and which is examined in further detail below. In any case this interaction with the traction device results in the outcome that the roller arrangement can be adjusted in its position between the scissor arms, that is to say can be moved further in the direction of the common pivot axis of the scissor frames between the pivot arms to raise it up, or can be moved in the opposite direction to lower it down. The inventive guiding of the traction device in an omega shape ultimately makes it possible for the overall lifting facility to be designed relatively compactly, since the traction device can be arranged in a fixed position by one end, for example on a scissor arm, for example in an upper area there, from where it runs to the roller unit or more precisely to the first deflecting roller, then runs via the roller arrangement and runs to the second deflecting roller, from where it then runs to its other end. That is to say the traction device ultimately runs roughly along the scissor arm, apart from the omega loop to the roller arrangement.

As explained the movement of the roller arrangement is accomplished by the interaction of the drive facility with the traction device. According to a first variant of one or more example embodiments of the present invention, provision can be made in this regard for the drive facility to comprise a winding shaft and a drive motor driving same, wherein the traction device is fixed by the other end to the winding shaft, wherein the position of the roller arrangement can be varied by winding the traction device onto and off of the winding shaft. In this first variant of one or more example embodiments of the present invention, the first end is therefore arranged fixed in position, for example on a scissor arm, while the other, lower end is fixed to a winding shaft. This winding shaft is turned via the drive motor so that for lifting the traction device can be wound onto the winding shaft. This results in the free traction device length between the positionally fixed end and the winding shaft being shortened. Since the traction device runs in the omega drive via the roller arrangement, and same can move freely relative to the roller unit, the roller arrangement is consequently displaced relative to the roller unit as a result of the shortening of the traction device, and moved in the direction of the common scissor frame pivot axis, which results in raising. If conversely the winding shaft is turned in the other direction so the traction device is wound off, then the free traction device length is increased which results in the load being almost removed from the roller arrangement and same moving away from its position when pulled to the pivot axis. This is assisted by the weight of the positioning table and also the potential patient situated on same. That is to say in this variant a traction device movement or more precisely a traction device length change takes place in order to actively move the roller arrangement incorporated into the omega drive, via the interaction of the drive facility with the traction device.

In essence it is possible to provide just one traction device and also one roller unit, and to arrange same on or adjacent to a scissor arm for example. According to an appropriate alternative to this provision can be made for two traction devices and also two roller units to be present, wherein one roller unit and one traction device is allocated to a scissor arm in each case. That is to say force is applied synchronously and symmetrically on both sides, since both traction devices are fixed to the common winding shaft, and so therefore force loading on the scissor frame arrangement does not take place just in a one-sided manner. Moreover a measure of redundancy is also implemented by this device, which makes it possible in the event of failure of a traction device, if same is ripped or similar for example, to still be able to maintain the lifting operation since same is taken over by the other traction device.

In essence the arrangement of the traction device together with the roller unit or the two traction devices together with the two roller units on or adjacent to the pivot arms makes it possible to keep the area between the scissor frames free, so further components or peripheral devices can be integrated in this area. Since the winding shaft is in any case arranged in the lower area of the scissor frames, preferably as close to the floor as possible, said winding shaft is also not an obstacle in the way. It just needs to be sufficiently long in the case of two traction devices that precisely the two traction devices provided on the frames can be wound onto and off of same.

To fix the one or more traction devices for example to the scissor arms or the winding shaft, corresponding holding facilities are naturally provided there, which can be designed as simply as possible. It is conceivable for example to provide on the traction device corresponding, for example T-shaped, slot-in plates that can be inserted in corresponding slot-shaped receiving points, for example of a holding device, arranged on the scissor arm, or a slot-shaped receiving point on the winding shaft. It is also conceivable to bolt on the end of a traction device, which is provided for example with a corresponding fixing device.

It is conceivable to arrange the deflecting rollers, preferably also like the first, upper end of the traction device, on one scissor arm of a scissor frame, that is to say rotatably mount the deflecting rollers directly on the scissor arm on short bearing journals provided there, for example via rolling or sliding bearings. If only one traction device is provided, only one scissor arm is equipped with deflecting rollers; if two traction devices are provided, both scissor arms are equipped with deflecting rollers.

Alternatively it is also conceivable for the deflecting rollers to be arranged on connecting shafts which connect the adjacently arranged scissor frames. According to this variant of one or more example embodiments of the present invention, the two scissor arms are connected to each other via two connecting shafts, which achieves additional stiffening of the frame arrangement. The deflecting rollers can then be rotatably mounted on said connecting shafts via suitable rolling or sliding bearings, wherein, since the traction device runs adjacent to the respective scissor arm, the deflecting rollers are also positioned adjacent to the scissor arm.

The, or more precisely each, roller unit is used, as described, to deflect and guide the traction device in line with the omega shape. In this regard the or each roller unit can be provided in a fixed position, that is to say the roller unit is not movable with reference to the scissor arm to which it is allocated. Naturally there is a relative movement of the roller unit during raising up or folding down of the frame arrangement. Nevertheless a fixed positional relationship exists between the roller unit and the allocated scissor arm, while the roller arrangement varies in position relative to same. As an alternative to this it is also conceivable for the or each roller unit to be guided in a movable manner along a guide track. This embodiment of the present invention allows a small relative movement of the roller unit with respect to the allocated scissor arm, by which the positional shift of the roller arrangement resulting from the change in length of the traction device, in the context of which positional shift the position of the rotational axis of the roller arrangement is displaced with respect to the positions of the rotational axes of the deflecting rollers, can be slightly compensated for so that the original omega shape of the traction device guiding does not change overly much between the two maximum positions that the frame arrangement can adopt when raised up and folded down. The degree of movement along the guide track, which can be straight or slightly curved, can also be only relatively small, depending on any required amount of compensation.

While, as already mentioned, the possibility exists of arranging the deflecting rollers directly on the respective scissor arm in a fixed position, for example via short bearing journals, a support can alternatively also be provided as part of the roller unit, on which the deflecting rollers can be arranged or more precisely rotatably mounted via corresponding bearing journals. Depending on the configuration this support can be positionally fixed, that is to say fastened in an immovable manner on the allocated scissor arm, or movable, that is to say capable of being displaced slightly along the guide track. Apart from direct mounting of the deflecting rollers on correspondingly short bearing journals on the support it is also conceivable for the connecting shafts to be arranged on the supports, which they connect, on which same the deflecting rollers are again rotatably mounted. This presents the possibility of implementing the roller unit almost as a compact construction unit, or prefabricating and installing a construction unit consisting of the two roller units together with the connecting shafts.

As described the one or more traction devices runs or run via the roller arrangement, that is to say loop around same, in order to be able to exert a force on same and press same between the scissor arms for the purpose of lifting or to support same during lowering. During winding on and off, a relative movement of the traction device with respect to the roller arrangement is produced due to the change in length of the traction device. To keep the movement as noise-free and friction-free as possible, it is useful if the one or more traction devices is or are looped via at least one rotatably mounted idler roller of the roller arrangement. That is to say the roller arrangement has a corresponding idler roller around which the one or more traction devices are looped. The said idler roller, mounted via rolling or sliding bearings on a central roller arrangement shaft, also rotates correspondingly in the event of a traction device movement so that a noise-free lifting movement is possible.

As explained the one or more traction devices is or are connected to a winding shaft, which same is preferably arranged in the lower area, close to the floor. It is useful if the winding shaft runs in a common pivot axis, about which two positionally fixed lower ends of the two scissors frames can be pivoted. Usually the two scissor frames are mounted by the lower ends of their pivot arms, so as to be capable of pivoting, firstly in a floating bearing capable of linear movement, and secondly in a positionally fixed locating bearing. That is to say one scissor arm end is capable of linear movement while the other scissor arm end is positionally fixed. The winding shaft is then usefully arranged in the common pivot axis of the two lower, positionally fixed pivot arm ends, that is to say the pivot axis and also the winding shaft axis coincide. It would even be conceivable to rotatably mount the pivot arm ends directly on the winding shaft via suitable rolling bearings. In any case this produces a compact construction since the winding shaft can be positioned as close as possible to the floor in such an arrangement.

The traction device itself can be of various types. In this respect it can consist of a belt, a cord, or a chain.

According to a second fundamental inventive alternative the traction device can also be fixed in position by its other end, wherein the drive facility comprises a drive motor and a wheel driven by same, via which the traction device runs, wherein the driven wheel sits on the same axis as the roller arrangement and is moved together with the roller arrangement and the drive motor. In this variant of one or more example embodiments of the present invention, no winding shaft is provided, instead the traction device is fixed in position at both ends, for example on a scissor arm. One end of the traction device in the area of the end of the upper arm, the other in the area of the end of the lower arm. Once again the traction device is led in an omega shape around the roller unit and also the roller arrangement. In this instance the roller arrangement moves almost on its own along the traction device, and in fact together with the drive motor and the driven wheel, which interacts in a suitable manner with the traction device and runs on and along same. In this variant of one or more example embodiments of the present invention, the roller arrangement actively changes its position, since the drive motor and the wheel are ultimately arranged at the roller arrangement or form part of same. The overall arrangement therefore "crawls" along the traction device and thus changes its position between the scissor arms.

In this regard there is also the option in this case of only providing one traction device and one roller unit. Alternatively it is also conceivable to provide two traction devices and two wheels driven via the common drive motor and also two roller units, wherein one roller unit and one traction device is allocated to a scissor arm in each case. Once again a symmetrical configuration is conceivable here, but wherein only one common drive motor is provided, which drives the two wheels provided in the area of the left and right ends of the roller arrangement, so the change in position is thus effected synchronously on both sides and actively by the corresponding application of force. Synchronous running is ensured since both wheels are driven via a common drive motor.

While it is essentially possible for the or each roller unit to be arranged in a fixed position on the respective scissor arm, and the roller unit to move along the section of the traction device extending from the one deflecting roller via the roller unit to the other deflecting roller, an advantageous inventive alternative provides in this regard for the or each roller unit to be guided in a movable manner along a guide track. That is to say that the or each roller unit is arranged along a straight or curved guide track on the respective scissor arm so that it can move together with the roller arrangement. The overall unit consisting of roller arrangement plus drive motor and the one or more wheels, and also the one or more roller units, moves during raising up and lowering down, that is to say it changes its position, wherein the relative position of the roller arrangement with respect to the roller unit or more precisely the deflecting rollers does not change or does so only slightly.

In this regard it is also conceivable with such a movable arrangement of the roller unit that the deflecting rollers are arranged on one pivot arm of a scissor frame, like in the first variant of one or more example embodiments of the present invention described above, on corresponding connecting shafts which connect the adjacently arranged scissor frames. Some movement of the roller unit is also essentially conceivable in such an arrangement if the deflecting rollers are mounted on corresponding bearing journals capable of moving along the guide track on the scissor frames, or if the connecting shafts are arranged correspondingly movably on the scissor arms.

An appropriate development provides in this regard that the or each roller unit has a support arranged in a movable manner on a scissor arm, wherein the deflecting rollers are mounted on the or each support, or wherein the connecting shafts are arranged at the supports, and connect same. Essentially in this case therefore the one or more supports are arranged in a movable manner directly on the scissor arms, whether along a straight or a curved guide track.

In this variant of one or more example embodiments of the present invention, a toothed belt or a chain is appropriately provided as a traction device (or traction mechanism or traction means) and a toothed wheel as the wheel. Since in this case the movement of the roller arrangement between the scissor arms is effected solely through the interaction of the wheel with the traction device, a reliable transmission of force is required in this area. This is ensured by the traction device and the wheel interacting in a toothed manner, for which purpose either a toothed belt or a chain is used as the traction device, while the wheel is a corresponding toothed wheel. The traction device is guided correspondingly tightly around the toothed wheel so that there is reliable engagement of the teeth in the receiving points in the belt.

As described the raising up and lowering down is effected by relative movement of the roller arrangement with respect to the scissor arms, that is to say the roller arrangement is moved inside the scissor arms, which open in a V shape. To achieve the most uniform lifting movement possible, viewed over the entire lifting path, an arched guide rail is appropriately arranged on each arm segment of a scissor frame, wherein the roller arrangement rests against both guide rails. Preferably, to raise or lower both scissor frames synchronously, corresponding guide rails are provided at the arm segments of both scissor frames, that is to say a total of four guide rails, wherein the roller arrangement extends from one scissor frame to the other scissor frame and runs on the respective guide rails. The guide rails are curved, wherein the bend radius, which can also vary locally, is selected correspondingly to ensure a uniform lifting and lowering movement in virtually any roller arrangement position.

In this regard the roller arrangement can appropriately have multiple separate, rotatably mounted guide rollers, wherein one guide roller in each case rests against one guide rail in each case. The said guide rollers, being rotatably mounted via rolling or sliding bearings on a roller arrangement axis, ensure a lifting operation that is as noise-free as possible, since in this area also, like with the idler roller of the roller arrangement, via which the traction device runs, there is no friction.

BRIEF DESCRIPTION OF THE DRAWINGS

Further advantages and details of the present invention arise from the exemplary embodiments described below and also on the basis of the drawings, in which:

FIG. 6 shows an enlarged partial view of the area of the roller arrangement, FIG. 7 shows an enlarged partial view of the area of the roller unit.

DETAILED DESCRIPTION

Figure 1:
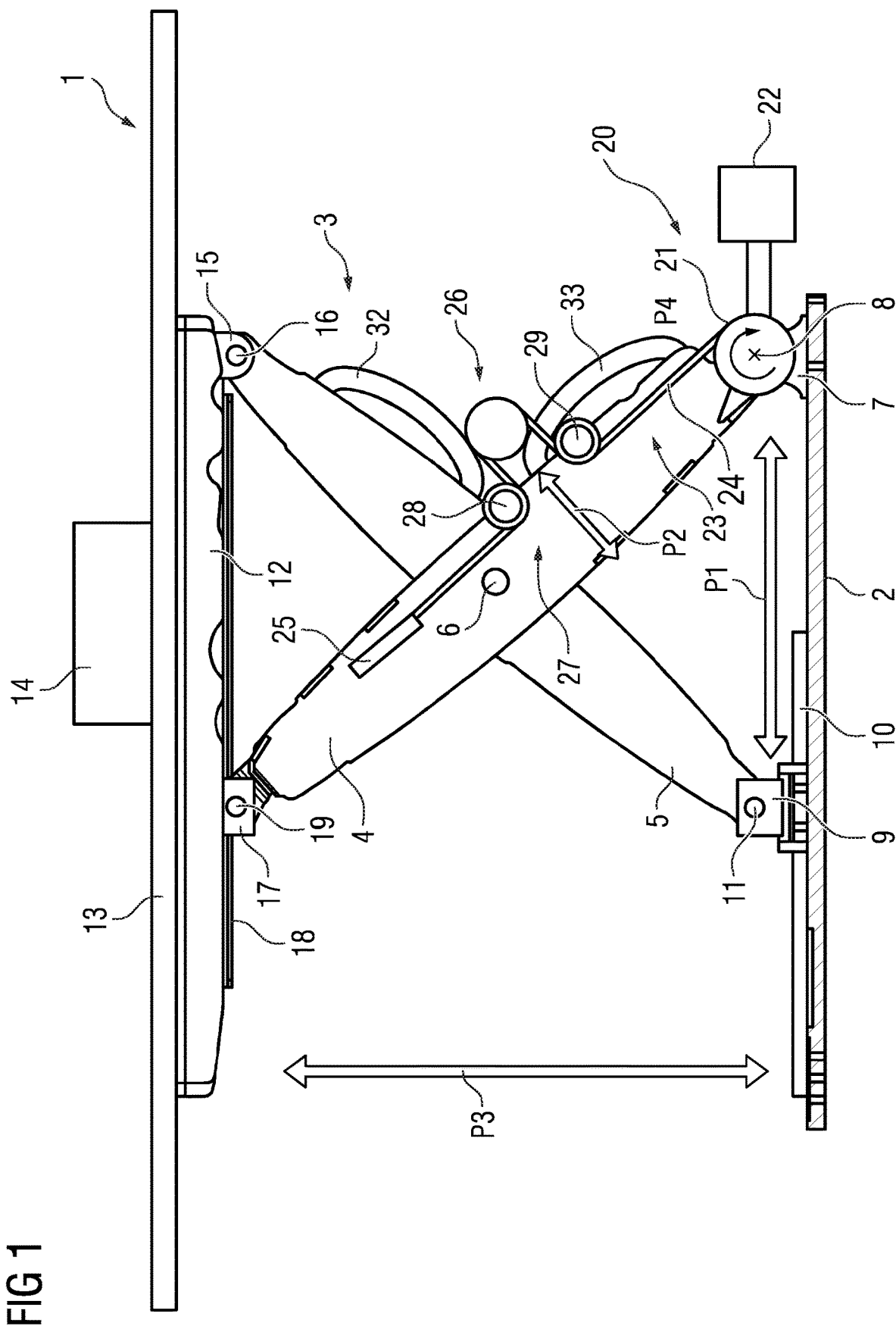
FIG. 1 shows a schematic representation of an inventive patient positioning table in a first embodiment variant in the raised setting.

FIG. 1 shows a schematic representation of an inventive patient positioning table 1 in a side view. The patient positioning table 1 has a frame support 2 on which two scissor frames 3 are arranged parallel to each other, while only one scissor frame 3 can be seen in the side view in FIG. 1. The two scissor frames are arranged spaced apart from each other laterally. Each scissor frame 3 has two scissor arms 4, 5, which are connected to each other in an X-shaped arrangement about a central pivot axis 6 so as to be capable of pivoting. The lower end of each scissor arm 4 is fixed to the frame support 2 via a locating bearing 7, wherein the locating bearing 7 also forms a pivot bearing at the same time, so that the respective scissor arm 4 being mounted essentially in the locating bearing 7 is also capable of pivoting via a pivot axis 8.

The lower end of each second scissor arm 5 is mounted via a floating bearing 9 on a linear track 10 on the plate-shaped or box-shaped frame support 2 so as to be capable of linear movement, as indicated by the double arrow P1. This lower end is also mounted in the floating bearing 9 so as to be cable of pivoting about a pivot axis 11. This pivot mounting by way of the pivot axes 8 and 11 is required since each scissor frame 3 is closed together and moved apart during the lifting movement, so that a corresponding pivoting of the arm is required.

Furthermore the two scissor frames 3 are connected by their upper ends to a table support 12, on which a positioning table 13 is arranged, preferably in a detachable manner, which positioning table supports the patient 14 who is only represented symbolically here. In this regard the upper end of the second scissor arm 5 is connected to the table support 12 via a locating bearing 15, wherein the pivot arm 5 in the locating bearing 15 is again mounted so as to be capable of pivoting about a pivot axis 16. The upper ends of the first scissor arms 4 are again each arranged so as to be capable of linear displacement on a linear track 18 via a floating bearing 17, wherein also here again the respective scissor arm 4 is accommodated in the floating bearing 17 so as to be capable of pivoting about a pivot axis 19. This locating/floating mounting also allows a corresponding adjustment movement with respect to the table support 12 to be realized.

Furthermore a lifting facility 20 is provided, which is implemented as a traction drive. It interacts with a winding shaft 21 which runs in the common pivot axis 8 of the locating bearing 7, that is to say the winding shaft 21 rotates about precisely this pivot axis 8. It reaches through the corresponding pivot bearing arrangements for example, which are realized via corresponding rolling bearings for example, by which the individual scissor arms 4 are pivot-mounted, and can be led to the outside on one side for example, where it is coupled to a drive motor 22, which is likewise only represented schematically here. The winding shaft 21 can be rotated via the drive motor 22, for example a torque motor, therefore, and in fact either in the clockwise or anticlockwise direction.

Furthermore the lifting facility 20 comprises a traction device (or traction mechanism or traction means) 23, here in the form of a belt 24, which is fixed to the winding shaft 21 by one end and can be wound onto and off of same. The course of the belt 24 is shown schematically in this side view since the belt 24 actually runs between the two scissor frames 3, or more precisely runs on the inner side of the one scissor arm 4 of the one scissor frame 3 and consequently would not be visible in a side view.

As shown in FIG. 1, the end of the belt 24 is fixed in a holding device 25, which is arranged in the example shown on the side of the scissor arm 4 in the direction of its upper end, that is to say in a fixed position.

Furthermore a roller arrangement 26 is provided and also a roller unit 27, around which the belt 24 is led in an omega-shape. The belt 24 runs from the positionally fixed end in the holding device 25 to a first deflecting roller 28 of the roller unit 27 and loops around the deflecting roller 28; from there it runs to the roller arrangement 26 and loops around same, after which it runs to a second deflecting roller 29 of the roller unit 27 and loops around same, from where it then runs to the winding shaft 21, again along the scissor arm 4. In this regard the arrangement of the two deflecting rollers 28, 29 and also of the roller arrangement 26 is such that a triangular shape is produced that enables the omega pathway.

The roller arrangement 26 runs via respective guide rollers 30, which are mounted so as to rotate via suitable rolling bearings on a central axis 31 of the roller arrangement 26, on corresponding guide rails 32, 33, which are arranged on the corresponding arm segments of the pivot arms 4, 5, and which are used for guiding the rollers. As shown in FIG. 1, the guide rails 32, 33 are implemented in curved form, and therefore have a curved running or guiding surface on which the deflecting rollers 30 run.

Figure 2:
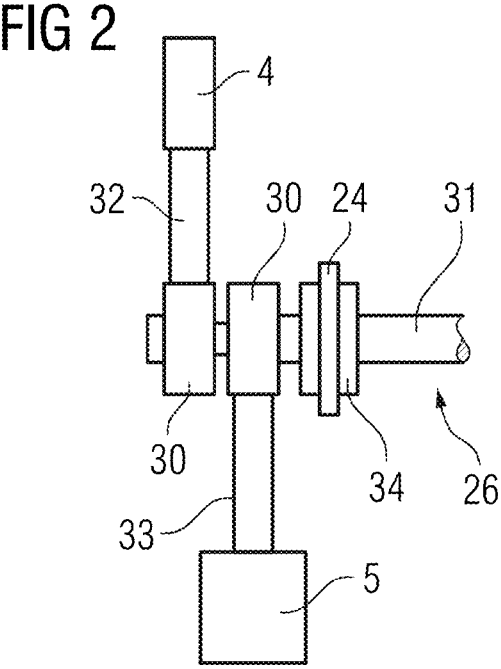
FIG. 2 shows an enlarged partial view of the area of the roller arrangement.

FIG. 2 also shows the belt 24, which is looped around an idler roller 34 mounted on the central shaft 31 via a rolling bearing.

Figure 3:
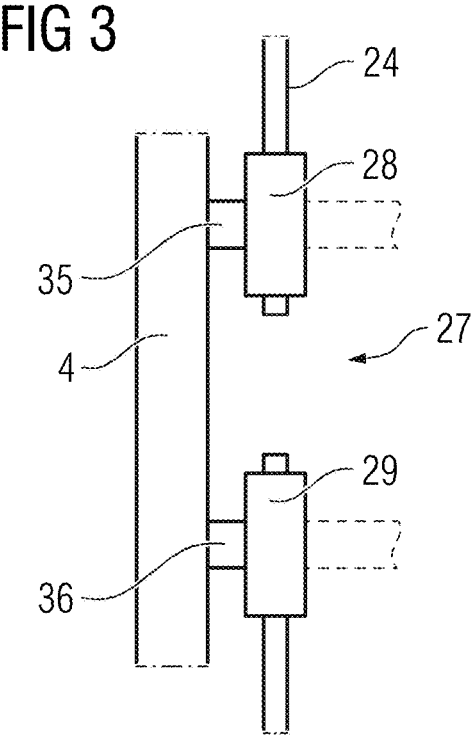
FIG. 3 shows an enlarged partial view of the area of the roller unit.

FIG. 3 shows a side view representing the arrangement of the guide rollers 28, 29. They are rotatably mounted on suitable bearing journals 35, 36 on the scissor arm 4 via suitable rolling bearings. Also shown here is the belt 24, which is guided on the deflecting rollers 28, 29. As can be seen the belt 24 runs parallel to the pivot arm 4 given that it is fixed there by its upper end in the holding device 25. As shown by broken lines the bearing journals 35, 36 can also be implemented in longer form as connecting shafts and connect the two scissor frames 3, wherein the deflecting rollers 28, 29 are then mounted on these connecting shafts.

This operates such that the winding shaft 21 is driven via the drive motor 22 and depending on the direction of rotation the belt 24 is either wound on or wound off. If the belt is wound on, then the length of the belt between the upper end of the belt 24 fixed in the holding device 25 and its winding position on the winding shaft 21 is shortened. The roller arrangement 26 is movable relative to the positionally fixed deflecting rollers 28, 29 and so can travel between the guide rails. If the belt 24 is wound on, then the free belt length is shortened, which results in the roller arrangement 26 being pulled in the direction of the roller unit 27 by the shortening belt 24, that is to say being pulled between the guide rails 32, 33. In the course of this the two guide rollers 30 run along the guide rails 32, 33 and spread them and therefore the scissor arms 4, 5 apart so that the scissor frames 4, 5 are raised up. In the raised position shown in FIG. 1 the roller arrangement 26 is positioned closely adjacent to the deflecting rollers 28, 29.

If the positioning table 13 is to be lowered, then the winding shaft 21 rotates in the opposite direction and the belt 24 is wound off. The free belt length is increased again; and the load on the roller arrangement 26 is consequently released and same can again be pushed oppositely under its own weight from its arrangement adjacent to the roller unit 27 to the outside, wherein the guide rollers 30 again run on the guide rails 32, 33. The roller arrangement 26 therefore moves away from the deflecting rollers 28, 29 again. In the course of this the positioning table 13 is necessarily lowered as a result of its own weight in conjunction with the table support 12 and also the patient 14 potentially resting on same.

Figure 4:
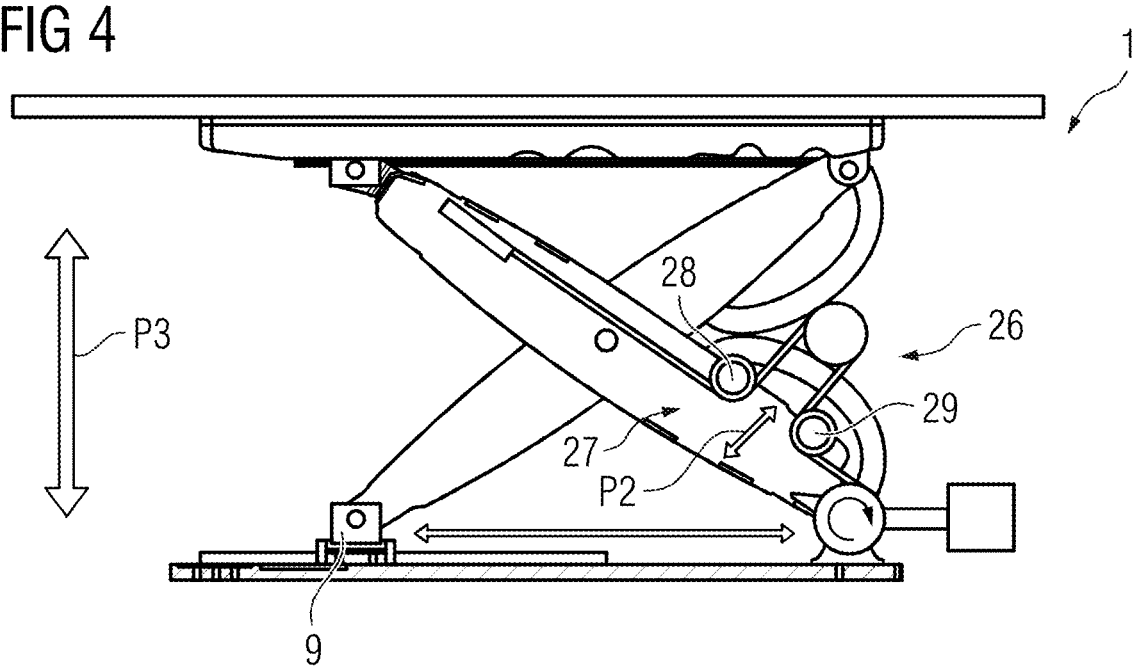
FIG. 4 shows the patient positioning table in FIG. 1 in a lowered position.

The relative movement of the roller arrangement 26 with respect to the positionally fixed roller unit 27 is represented by the double arrow P2 in FIGS. 1 and 4, while the general lifting and lowering movement is represented by the double arrow P3.

It may be sufficient to provide only one traction device 23 and one roller unit 27 on one scissor arm 4. That is to say the flow of force or more precisely the force coupling of the lifting facility 20 to the scissor frame arrangement is effected on only one scissor frame 3. It is also conceivable however to provide two traction devices 23 and two roller units 27, which are each provided on one scissor arm 4 of each scissor frame 3. The upper belt ends are fastened in the holding devices 25 on the scissor arm 4 in each case, while the two lower belt ends are fixed to the common winding shaft 21, so that the two belts 24 can be wound on and off synchronously. In this case the two scissor frames 3 are consequently put under load synchronously and actively raised up or folded together. The doubled-up belt arrangement also has a redundancy benefit, since in the event of a ripped belt the remaining belt can of course continue the lifting operation.

FIGS. 5-8 show a further inventive variant of a patient positioning table 1, wherein the same reference symbols are used for identical components as far as possible. Here also, two parallel scissor frames 3 are again provided, each comprising a first scissor arm 4 and a second scissor arm 5, which can be pivoted about a common pivot axis 6. Once again a first locating bearing 7 and also a first floating bearing 9 are provided, by which the lower-area mounting is effected on the frame support 2, wherein here once again the scissor arms 4, 5 are mounted in a pivoting manner in corresponding pivot axes 8, 11. The upper-area ends are once again mounted in a pivoting manner in corresponding pivot axes 16, 19 in corresponding locating bearings 15 and floating bearings 17. The essential construction corresponds to that in the preceding figures, and reference is made to the relevant implementations.

Here too guide rails 32, 33 with an arched running surface are arranged in each case on the pivot arms 4, 5, preferably on both scissor frames 3, on which guide rails the roller arrangement 26 runs with corresponding guide rollers 30 (see also FIG. 6 in this regard). A roller unit 27 with two deflecting rollers 28, 29 is likewise provided, and also a traction device 23, here in the form of a chain 37. In this configuration the belt 24 is fixed by both ends in corresponding holding devices 25 on the scissor arm 4.

In this variant the belt 24 is likewise guided in an omega shape around the deflecting rollers 28, 29 and also the roller arrangement 26, but each configuration of the roller unit 27 is different from the above embodiment, as is the fundamental drive.

FIG. 7 shows a schematic representation of the roller unit 27. This comprises the deflecting rollers 28, 29, which in this example are rotatably mounted on corresponding bearing journals 35, 36, which are arranged on a plate-like support 38 in this case. The support 38 itself is guided in a movable manner in a corresponding linear track 39, either straight or along a curved track, on the scissor arm 4, wherein in this case the linear track 39 is more or less integrated in the scissor arm 4, but can also be provided on the side of same. That is to say here the roller unit 27 is more or less a self-contained constructional element, which can also be separately manufactured and mounted on the linear track 39. Since here also two chains 37 are preferably provided, each adjacent to the respective scissor arm 4, the arrangement shown in FIG. 4 is naturally also provided on the other side.

The roller unit 26 is shown in a more detailed schematic representation in FIG. 6. As explained it again comprises the four guide rollers 30, with which it is guided on the respective guide rails 32, 33. Also provided here, since two chains 37 are provided in the exemplary embodiment, are two toothed wheels 40 that are rotatably mounted on the central axis 31, which are connected via respective drive shafts 41 to the drive motor 22, which sits here on the central shaft 31. That is to say the toothed wheels 40 can be rotated actively, synchronously, and in the same direction of rotation via the drive motor 22. The toothed wheels 40 engage in the chains 37, that is to say a form-fitting toothed connection exists there.

Figure 5:
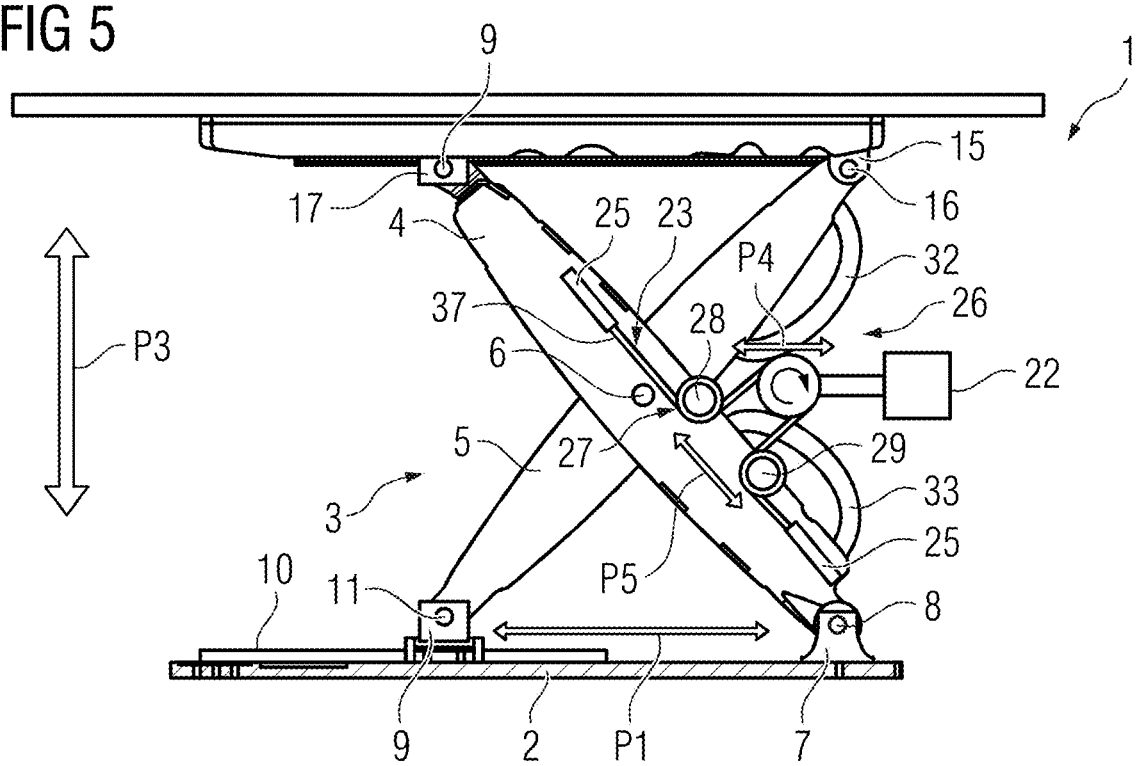
FIG. 5 shows a schematic representation of an inventive patient positioning table in a second embodiment variant in a raised position.
Figure 8:
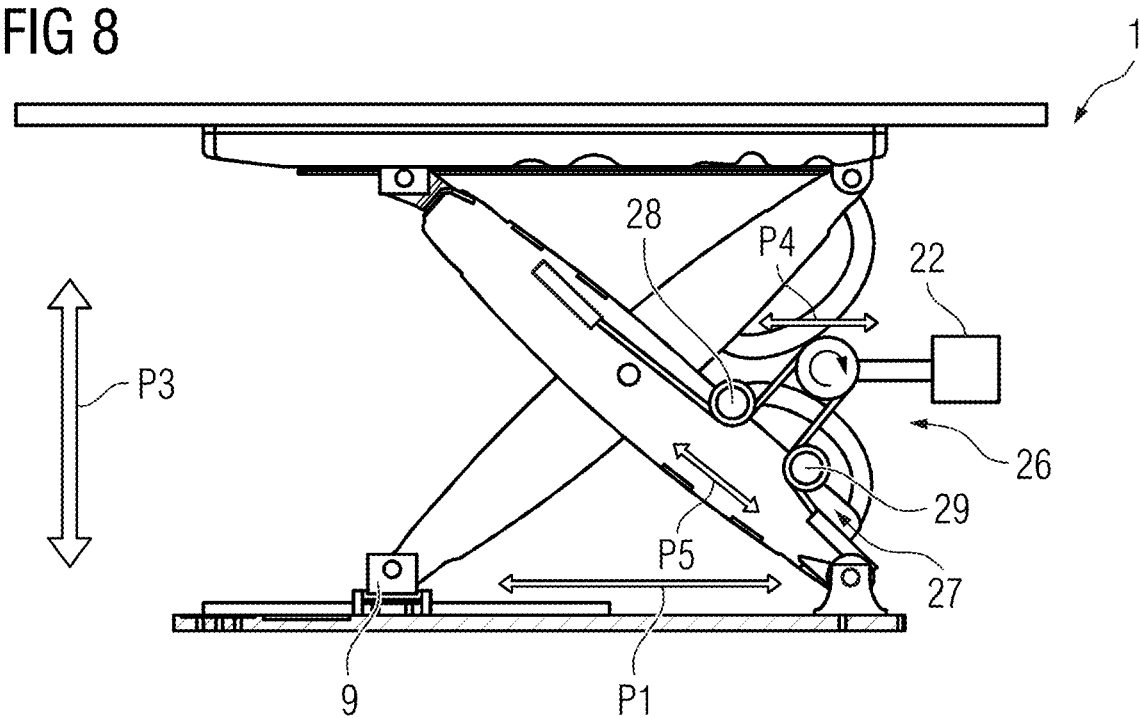
FIG. 8 shows the patient positioning table in FIG. 5 in a lowered position.

Operation is such that in order to lift or lower the drive motor 22 rotates the drive shafts 41, and via same, the toothed wheels 40. Since the chain 37 is positionally fixed or clamped by both ends, the length of the chain 37 cannot be changed. The rotation of the toothed wheels 40 then has the effect that the roller arrangement 26 more or less travels or "crawls" along the chains 37, and in so doing necessarily changes its position between the guide rails 32, 33. At the same time the roller unit 27 also moves along the linear guideway 39 in its guide track, that is to say the entire unit consisting of roller unit 27 and roller arrangement 26 including the drive motor 22 travels or is moved. Depending on the direction of rotation of the drive shafts 41 there is a movement in the direction of the pivot axis 6 or away from the pivot axis 6, while the roller units 27 are moved correspondingly at the same time. In this regard the roller units 27 are moved along the linear track 39 such that ultimately the geometric arrangement of the roller arrangement 26 or more precisely the rotational axis of the toothed wheels 40 and the arrangement of the deflecting rollers 28, 29 or more precisely their rotational axes does not change during the movement. The arched shape of the guide rails 32, 33 can also be adapted correspondingly in this respect. FIG. 5 shows the patient positioning table in the raised-up form, FIG. 8 in the lowered-down form.

Overall this produces an omega drive, which travels along the chains 37. The corresponding movement of the roller facility 26 is represented by the double arrow P4, while the movement of the roller unit 27 is represented by the double arrow P5. Although in the example shown the arrows P4, P5 stand at an angle to each other, which is just intended to indicate that precisely the roller arrangement is moved inward and outward between the guide rails 32, 33 while at the same time the roller units 27 are also moved, the corresponding directions of movement ultimately run almost parallel, since as explained the geometric arrangement of the roller arrangement 26 and roller unit 27 does not change during the movement; instead the entire assembly ultimately travels along the chains 37.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing embodiments. The present invention may, however, be embodied in many alternate forms and should not be construed as limited to only the embodiments set forth herein.

Although the present invention has been closely illustrated and described in detail by the preferred exemplary embodiment, the present invention is not limited by the examples disclosed and other variations can be derived from same by a person skilled in the art without departing from the scope of protection of the present invention.

What is claimed is:

1. A patient positioning table, comprising:
   two scissor frames, each of the two scissor frames having a first scissor arm and a second scissor arm,
   wherein the first scissor arm and the second scissor arm are connected to each other in an X-shaped arrangement so as to be configured to
   pivot about a common pivot axis, and
   pivot relative to each other through a lifting facility for vertically moving the patient positioning table,
   wherein the lifting facility includes a roller arrangement coupled to, and configured to move via, at least one traction device,
   wherein said roller arrangement is arranged between, and configured to guide, the two scissor frames,
   wherein at least a first end of the at least one traction device is fixed in position,
   wherein the at least one traction device is arranged around at least one roller unit,
   wherein the at least one roller unit includes deflecting rollers,
   wherein a first of the deflecting rollers and a second of the deflecting rollers are arranged on the first scissor arm intermediate the common pivot axis and an end of the first scissor arm, and configured, with the roller arrangement, such that the at least one traction device is arranged in an omega shape,
   wherein the position of the roller arrangement between the two scissor frames is variable by a drive facility that is configured to interact with the at least one traction device, and
   wherein each of the at least one roller unit has a support arranged in a positionally fixed or movable manner on the first scissor arm or the second scissor arm, wherein the deflecting rollers are arranged on the support.

2. The patient positioning table as claimed in claim 1, wherein the drive facility comprises:
   a winding shaft; and
   a drive motor configured to drive the winding shaft, wherein
   the at least one traction device is fixed to the winding shaft at a second end of the at least one traction device, and
   the position of the roller arrangement is variable by winding the at least one traction device onto and off of the winding shaft.

3. The patient positioning table as claimed in claim 2, wherein
   the at least one traction device includes at least two traction devices,
   the at least one roller unit includes at least two roller units, and
   a first roller unit, among the at least two roller units, and a first traction device, among the at least two traction devices, is allocated to the first scissor arm of a first scissor frame, among the two scissor frames.

4. The patient positioning table as claimed in claim 3, wherein
   the deflecting rollers are arranged on the first scissor arm of the first scissor frame, among the two scissor frames, or
   the deflecting rollers are arranged on connecting shafts that connect the two scissor frames, which are arranged adjacent to one another.

5. The patient positioning table as claimed in claim 2, wherein
   the at least one roller unit is fixed in position, or
   the at least one roller unit is configured to be guided in a movable manner along a guide track.

6. The patient positioning table as claimed in claim 2, wherein
   the deflecting rollers are mounted on the support; or
   connecting shafts are arranged at and connected to the support.

7. The patient positioning table as claimed in claim 2, wherein the at least one traction device is arranged around at least one rotatably mounted idler roller of the roller arrangement.

8. The patient positioning table as claimed in claim 2, wherein the winding shaft is configured to run about a common pivot axis, and wherein a positionally fixed lower end of each of the two scissors frames is configured to pivot about the common pivot axis.

9. The patient positioning table as claimed in claim 2, wherein the at least one traction device is a belt, a cord or a chain.

10. The patient positioning table as claimed in claim 1, wherein
the at least one traction device is fixed in position at a second end,
the drive facility includes at least one wheel and a drive motor, the drive motor being configured to drive the at least one wheel to run the at least one traction device,
the at least one wheel sits on a same axis as the roller arrangement or forms part of the roller arrangement, and
the at least one wheel is configured to move together with the roller arrangement and the drive motor.

11. The patient positioning table as claimed in claim 10, wherein
the at least one traction device includes at least two traction devices,
the at least one wheel includes at least two wheels driven via the drive motor,
the at least one roller unit includes at least two roller units, and
a first roller unit, among the at least two roller units, and a first traction device, among the at least two traction devices, is allocated to the first scissor arm of a first scissor frame, among the two scissor frames.

12. The patient positioning table as claimed in claim 10, wherein the at least one roller unit is configured to be guided in a movable manner along a guide track.

13. The patient positioning table as claimed in claim 12, wherein
the deflecting rollers are arranged on the first scissor arm of a first scissor frame, among the two scissor frames, or
the deflecting rollers are arranged on connecting shafts that connect the two scissor frames, which are arranged adjacent to one another.

14. The patient positioning table as claimed in claim 12, wherein
the support of at least one of the at least one roller unit is arranged in a movable manner on the first scissor arm of a first scissor frame, among the two scissor frames, and
one of (i) the deflecting rollers are mounted on the support, or (ii) connecting shafts are arranged at and connected to the support.

15. The patient positioning table as claimed in claim 10, wherein the at least one traction device is a toothed belt or a chain, and the at least one wheel is a toothed wheel.

16. The patient positioning table as claimed in claim 1, wherein an arched guide rail is arranged on each of the first scissor arm and the second scissor arm of a first scissor frame, among the two scissor frames, and the roller arrangement rests against the arched guide rails.

17. The patient positioning table as claimed in claim 16, wherein the roller arrangement has multiple separate, rotatably mounted guide rollers, wherein a first guide roller, among the multiple separate, rotatably mounted guide rollers, rests against the arched guide rail arranged on at least one of the first scissor arm or the second scissor arm.

18. The patient positioning table as claimed in claim 4, wherein
the deflecting rollers are mounted on the support; or
the connecting shafts are arranged at and connected to the support.

19. The patient positioning table as claimed in claim 13, wherein
the support of at least one of the at least one roller unit is arranged in a movable manner on the first scissor arm of the first scissor frame, among the two scissor frames, and
one of (i) the deflecting rollers are mounted on the support, or (ii) connecting shafts are arranged at and connected to the support.

20. The patient positioning table as claimed in claim 3, wherein the winding shaft is configured to run about a common pivot axis, and wherein a positionally fixed lower end of each of the two scissors frames is configured to pivot about the common pivot axis.

21. The patient positioning table as claimed in claim 1, wherein a first portion of the at least one traction device extends between the first of the deflecting rollers and the roller arrangement, and a second portion of the at least one traction device extends between the second of the deflecting rollers and the roller arrangement and parallel to the first portion of the at least one traction device, the first portion of the at least one traction device and the second portion of the at least one traction device extending directly from the first scissor arm.

* * * * *